(12) United States Patent
Singh et al.

(10) Patent No.: US 12,471,917 B2
(45) Date of Patent: Nov. 18, 2025

(54) ENDOSCOPIC CLIP WITH POSITIVE LOCK

(71) Applicants: BOSTON SCIENTIFIC MEDICAL DEVICE LIMITED, Galway (IE); BOSTON SCIENTIFIC SCIMED, INC., Maple Grove, MN (US)

(72) Inventors: Rajivkumar Singh, Thane (IN); Shrikant Vasant Raut, Mumbai (IN); Arun Adhikarath Balan, Aluva (IN); Paul Smith, Smithfield, RI (US)

(73) Assignees: Boston Scientific Medical Device Limited, Galway (IE); Boston Scientific Scimed, Inc., Maple Grove, MN (US)

( * ) Notice: Subject to any disclaimer, the term of this patent is extended or adjusted under 35 U.S.C. 154(b) by 618 days.

(21) Appl. No.: 17/811,979

(22) Filed: Jul. 12, 2022

(65) Prior Publication Data
US 2023/0053352 A1    Feb. 23, 2023

Related U.S. Application Data

(60) Provisional application No. 63/260,418, filed on Aug. 19, 2021.

(51) Int. Cl.
*A61B 17/072* (2006.01)
*A61B 17/00* (2006.01)
*A61B 17/32* (2006.01)

(52) U.S. Cl.
CPC ........ *A61B 17/07207* (2013.01); *A61B 17/32* (2013.01); *A61B 2017/00477* (2013.01)

(58) Field of Classification Search
CPC .......... A61B 17/0682; A61B 17/07207; A61B 17/083; A61B 17/10; A61B 17/122;
(Continued)

(56) References Cited

U.S. PATENT DOCUMENTS 4,449,530 A * 5/1984 Bendel ................. A61B 17/122
606/158
5,156,609 A * 10/1992 Nakao .................... A61B 17/10
606/205
(Continued)

FOREIGN PATENT DOCUMENTS

CN    111432737    7/2017
CN    207012212    2/2018
(Continued)

OTHER PUBLICATIONS

Mount definition & Meaning, Merriam-Webster, accessed Jun. 23, 2025 from https://www.merriam-webster.com/dictionary/mount (Year: 2025).*

*Primary Examiner* — Kankindi Rwego
(74) *Attorney, Agent, or Firm* — Fay Kaplun & Marcin, LLP

(57) ABSTRACT

A clipping system includes a cap, a clip and a control member. The cap includes a channel extending therethrough. A proximal portion of the cap is mounted over the endoscope such that a distal portion of the cap extends distally past a distal end of an endoscope. The distal portion of the channel includes opposing surfaces therealong defining a tapered portion tapering from the distal end of the cap toward a proximal end. The clip is mounted within the cap. The clip includes jaws movably connected via hinges. At least one of the hinges is biased to move the jaws away from one another. The clip is movable relative to the cap between open and closed configurations. The control member longitudinally movable relative to the cap to move the clip between the open and closed configurations.

19 Claims, 2 Drawing Sheets

(58) Field of Classification Search
CPC ............ A61B 17/1222; A61B 17/1227; A61B 17/128; A61B 17/1285; A61B 17/32; A61B 2017/00296; A61B 2017/00477; A61B 2017/00535; A61B 2017/00539; A61B 2017/0054; A61B 2017/0641; A61B 2017/2905; A61B 1/00064; A61B 1/00071; A61B 1/0008; A61B 1/00087; A61B 1/00101; A61B 1/0137
USPC .................................................. 606/142, 143
See application file for complete search history.

(56) References Cited

U.S. PATENT DOCUMENTS

| | | | |
|---|---|---|---|
| 7,815,653 B2 * | 10/2010 | Stokes | A61B 17/1227 606/142 |
| 8,945,157 B2 | 2/2015 | Gordon et al. | |
| 9,855,053 B2 | 1/2018 | Bagaoisan et al. | |
| 10,154,842 B2 | 12/2018 | Wells et al. | |
| 10,729,448 B2 | 8/2020 | Patel et al. | |
| 2002/0151916 A1 * | 10/2002 | Muramatsu | A61B 17/1227 606/158 |
| 2006/0212049 A1 * | 9/2006 | Mohiuddin | A61B 17/083 606/151 |
| 2006/0217744 A1 * | 9/2006 | Bender | A61B 17/0057 606/142 |
| 2007/0265640 A1 | 11/2007 | Kortenbach et al. | |
| 2011/0152888 A1 * | 6/2011 | Ho | A61B 1/00087 606/151 |
| 2014/0316440 A1 | 10/2014 | Gordon | |
| 2015/0257757 A1 | 9/2015 | Powers et al. | |
| 2018/0271532 A1 | 9/2018 | Shellenberger | |
| 2019/0314031 A1 | 10/2019 | Thomas et al. | |
| 2019/0357913 A1 | 11/2019 | Pilletere et al. | |
| 2020/0205836 A1 | 7/2020 | Uesaka et al. | |

FOREIGN PATENT DOCUMENTS

| | | |
|---|---|---|
| CN | 210931631 | 7/2020 |
| CN | 210990533 | 7/2020 |
| CN | 212466088 | 2/2021 |
| EP | 3808286 | 4/2021 |
| JP | 2012-115386 A | 6/2012 |
| WO | 2020/036325 | 2/2020 |

* cited by examiner

ENDOSCOPIC CLIP WITH POSITIVE LOCK

PRIORITY CLAIM

The present disclosure claims priority to U.S. Provisional Patent Application Ser. No. 63/260,418 filed Aug. 19, 2021; the disclosure of which is incorporated herewith by reference.

FIELD

The present disclosure relates to endoscopic devices and, in particular, relates to endoscopic clipping devices for treating tissue along the gastrointestinal tract.

BACKGROUND

Physicians have become more willing to perform aggressive interventional and therapeutic endoscopic gastrointestinal (GI) procedures, which may increase the risk of perforating the wall of the GI tract or may require closure of the GI tract wall as part of the procedure. Such procedures may include, for example, the removal of large lesions, tunneling under the mucosal layer of the GI tract to treat issues below the mucosa, full thickness removal of tissue, entering the body via the GI tract and penetrating tissue to exit the GI tract to operate on tissue outside the GI tract, and endoscopic treatment/repair of post-surgical issues (e.g., post-surgical leaks, breakdown of surgical staple lines, and anastomotic leaks).

Currently, tissue may be treated via endoscopic closure devices including through-the scope clips or over-the-scope clips. Over-the-scope clips may be particularly useful for achieving closure of larger tissue defects. These endoscopic closure devices can save costs for the hospital and may provide benefits for the patient. In some cases, however, current endoscopic closure devices may be difficult to use, time consuming to position, or insufficient for certain perforations, conditions and anatomies. For example, current over-the-scope clips generally require launching of the clip from a position in which the clip itself is not visible to the operator. That is, prior to clipping the operator may view the target tissue to be clipped and, based on this visualization of the target tissue may determine that the distal end of the device and the clip are in a desired position relative to the target tissue. Based on the observation of the target tissue, the operator then deploys the clip without being able to see the clip itself until it is deployed.

SUMMARY

The present disclosure relates to a clipping system for treating tissue which includes a cap configured to be mounted over a distal end of an endoscope, the cap extending longitudinally from a proximal end to a distal end and including a channel extending therethrough, a proximal portion of the cap configured to be mounted over the endoscope such that a distal portion of the cap extends distally past the distal end of the endoscope, the distal portion of the channel including opposing surfaces therealong defining a tapered portion tapering from the distal end of the cap toward a proximal end; a clip configured to be mounted within the cap, the clip including first and second jaws movably connected to one another via hinges, at least one of the hinges being biased to move the first and second jaws away from one another, the clip movable relative to the cap between an open configuration, in which the first and second jaw are separated from one another to receive tissue therebetween, and closed configurations, in which the first and second jaws are moved toward one another to grip tissue therebetween, when the first and second jaws are slid longitudinally along the tapered portion of the channel; and a control member extending from a distal end releasably coupled to the clip to a proximal end accessible via a user, the control member longitudinally movable relative to the cap to move the clip between the open and closed configurations.

In an embodiment, the clip includes a lock configured to lock the clip toward the closed configuration, the lock including a first component extending from the first jaw and a second component extending from the second jaw, the first and second components configured to engage one another when the first and second jaws are drawn sufficiently close to one another.

In an embodiment, the first and second components are configured to engage one another via a snap fit.

In an embodiment, the opposing surfaces along distal portion of the channel of the cap define a planar portion extending proximally from the proximal end of the tapered portion, the planar portion extending parallel to a longitudinal axis of the system so that, when the clip is drawn proximally thereinto, the first and second jaws are drawn toward one another so that the first and second components of the lock engage one another.

In an embodiment, the opposing surfaces along the distal portion of the channel also define a shoulder extending proximally of the planar portion, the shoulder extending radially inward relative to the planar portion such that, when a portion of the clip engages the shoulder, the clip is prevented from moving any further proximally therepast.

In an embodiment, each of the first and second jaws are substantially U-shaped extending from a first end to a second end, first ends of the first and second jaws connected to one another via a first one of the hinges and second ends of the first and second jaws connected to one another via a second one of the hinges.

In an embodiment, the first and second jaws are configured such that, when the clip is in the open configuration, the first and second jaws define an opening therebetween.

In an embodiment, a distal portion of the control member is releasably looped over at least one of the hinges of the clip, the distal portion of the control member configured to release the clip when a force exerted thereon exceeds a predetermined threshold value.

In an embodiment, each of the first and second jaws include tissue gripping features extending therefrom, toward one another.

The present disclosure also relates to a tissue clipping system which includes an endoscope extending longitudinally from a proximal end to a distal end and including a working channel extending therethrough; a cap extending longitudinally from a proximal end to a distal end and including a channel extending therethrough, the cap configured to be mounted over the distal end of the endoscope so a proximal portion of the cap extends over the endoscope, a distal portion of the cap extends distally past the distal end of the endoscope, and a channel of the cap is aligned with the working channel of the endoscope, an interior of the distal portion of the channel including opposing surfaces therealong defining a tapered portion tapering from the distal end of the cap toward a proximal end and a planar portion extending proximally from the proximal end of the tapered portion; a clip including first and second jaws movably connected to one another via hinges, at least one of the hinges being biased to move the first and second jaws away from one another, the clip movably mounted within the cap so that the clip is movable relative to the cap between an open configuration, in which the first and second jaw are separated from one another to receive tissue therebetween, and closed configurations, in which the first and second jaws are moved toward one another to grip tissue therebetween, when the first and second jaws are slid longitudinally along the tapered portion of the channel, the clip including a lock configured to lock the first and second jaws relative to one another toward the closed configuration when the clip is moved proximally along the planar portion; and a control member extending from a distal end releasably coupled to the clip, through the working channel of the endoscope to a proximal end accessible via a user, the control member longitudinally movable relative to the endoscope to move the clip between the open and closed configurations.

In an embodiment, the lock includes a first component extending from the first jaw and a second component extending from the second jaw, the first and second components configured to engage one another when the first and second jaws are slid proximally along the planar portion.

In an embodiment, the opposing surfaces along the distal portion of the channel also define a shoulder extending proximally of the planar portion, the shoulder extending radially inward relative to the planar portion such that, when a portion of the clip engages the shoulder, the clip is prevented from moving any further proximally therepast.

In an embodiment, the control member is releasably coupled to the clip such that, when the clip proximally engages the shoulder and a force exerted on the control member exceeds a predetermined threshold value, the clip is released from the control member.

In an embodiment, the first and second jaws are configured such that, when the clip is in the open configuration, the first and second jaws define an opening therebetween.

In an embodiment, the system further includes a tissue grasping device configured to be inserted through the working channel of the endoscope and between the first and second jaws of the clip to grasp a target tissue and drawn the target tissue into the cap between the first and second jaws.

In addition, the present disclosure relates to a method for treating tissue which includes inserting a clip to a target area in a body lumen via an endoscope, in an insertion configuration, the clip mounted to a distal end of an endoscope via a cap, a proximal end of the cap extending over the distal end of the endoscope and a distal portion of the cap extending distally of the distal end of the endoscope, the clip mounted within the distal portion of the cap so that the clip is within a field of view of the endoscope; moving the clip toward an open configuration, in which first and second jaws of the clip are separated from one another, by drawing a control member releasably coupled to the clip distally relative to the endoscope so that the first and second jaws slid distally along a tapered portion of the channel of the cap, which flares outward from a proximal end of the tapered portion toward the distal end of the cap; drawing the target tissue into the cap and between the first and second jaws; moving the clip toward a closed configuration, in which the first and second jaws of the clip are moved toward one another to grip the target tissue therebetween, by drawing the control member proximally relative to the endoscope so that the first and second jaws slide proximally along the tapered portion; and locking the clip toward the closed configuration by drawing the control member further proximally until the first and second jaws of the clip slide proximally along a planar portion of the channel extending proximally from the proximal end of the tapered portion, a distance between opposing surfaces of the planar portion being selected so that when the clip is slid proximally along the planar portion, the first and second jaws are moved toward one another via a distance causing a lock thereof to engage.

In an embodiment, the method further includes moving the clip toward the open configuration to reposition the clip relative to the target tissue prior to locking of the clip; and moving the clip toward the closed configuration so that repositioned first and second jaws of the clip grip the target tissue.

In an embodiment, the method further includes deploying the clip by drawing the control member proximally relative to the endoscope so that the clip engages a shoulder proximal of the planar portion, which prevents the clip from moving further proximally relative thereto, and a force exerted on the control member exceeds a predetermined threshold value so that the clip is separated from the control member.

In an embodiment, the drawing of the target tissue into the cap and between the first and second jaws includes inserting a tissue grasper through a working channel of the endoscope and between the first and second jaws to grasp the target tissue.

In an embodiment, the lock of the clip includes a first component extending from the first jaw and a second component extending from the second jaw, the first and second jaws configured to engage one another via a snap fit.

BRIEF DESCRIPTION

DETAILED DESCRIPTION

Figure 1:
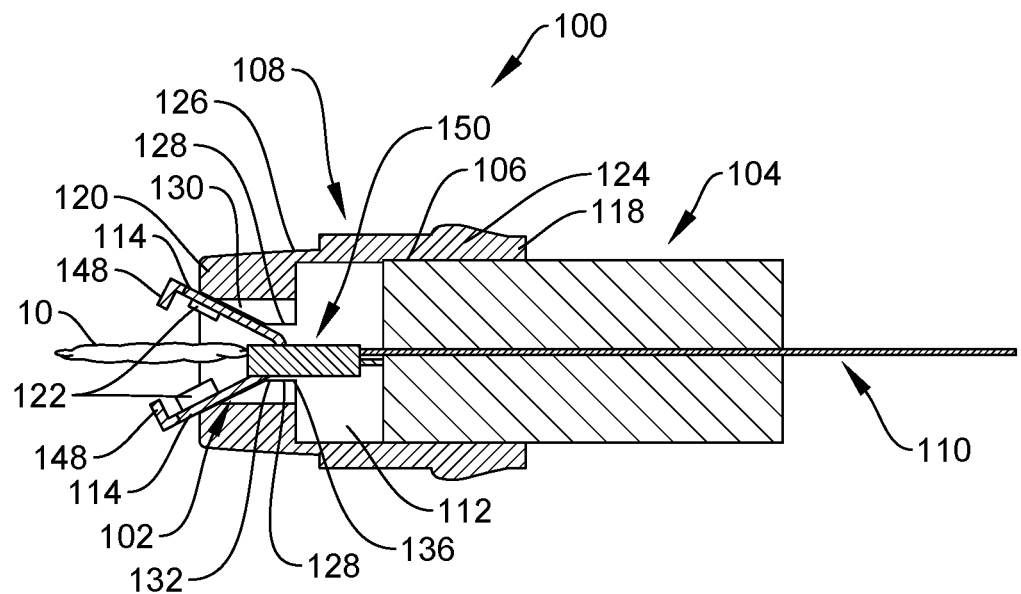
FIG. 1 shows a longitudinal cross-sectional side view of a distal portion of a tissue clipping system according to an exemplary embodiment of the present disclosure, a clip of the system in an open configuration.

The present disclosure may be further understood with reference to the following description and the appended drawings, wherein like elements are referred to with the same reference numerals. The present disclosure relates to a clipping system and, in particular, relates to an endoscopic clipping system, in which an initial placement of a clip may be viewed and adjusted prior to a deployment thereof. Similarly to over-the-scope clip devices, exemplary embodiments of the present disclosure comprise a clip mountable to a distal end of the endoscope via a cap. Unlike traditional over-the-scope clips, however, rather than being mounted over the cap, the cap of the present disclosure is mounted within the cap and is movable relative thereto between an open configuration and a closed configuration so that a position of the clip may be adjusted relative to a target tissue, as desired, prior to a deployment of the clip.

The clip is configured so that, when the clip is mounted within the cap, both the clip and the target tissue are within a field of view of the endoscope. Thus, an operator of the system is able to visualize a position of the clip relative to the target tissue so that the clip may be moved between the open and closed configurations until the target tissue has been gripped via the clip, as desired. The clip includes a lock so that, once an operator of the system has visually confirmed that the target tissue has been gripped via the clip, as desired, the clip may be locked toward the closed configuration and deployed so that the clip remains clipped over the target tissue and is separated from the endoscope. It will be understood by those of skill in the art that the terms proximal and distal, as used herein, are intended to refer to a direction toward and away from, respectively, a user of the device.

Figure 2:
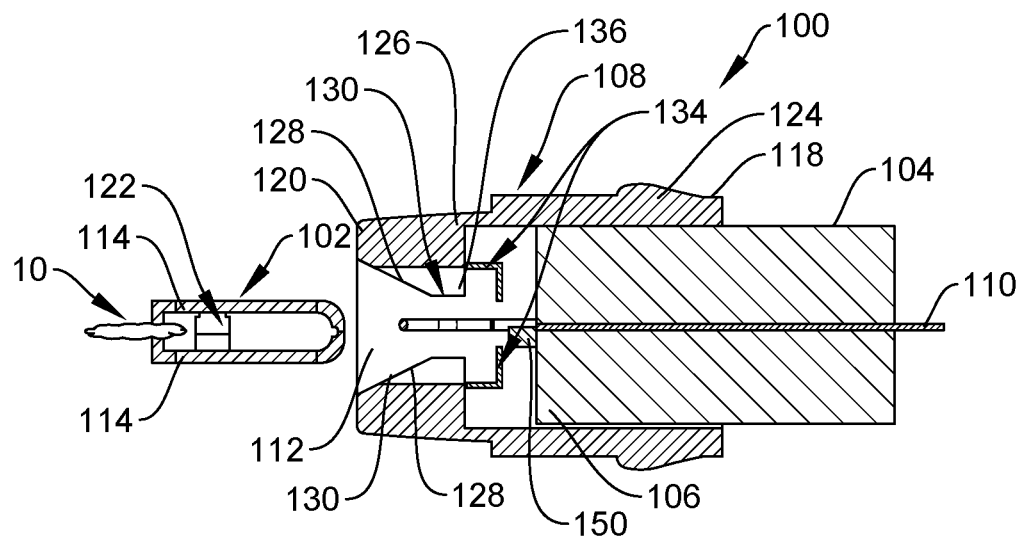
FIG. 2 shows a longitudinal cross-sectional side view of the distal portion of the system of FIG. 1, the clip of the system locked and deployed in a closed configuration.
Figure 3:
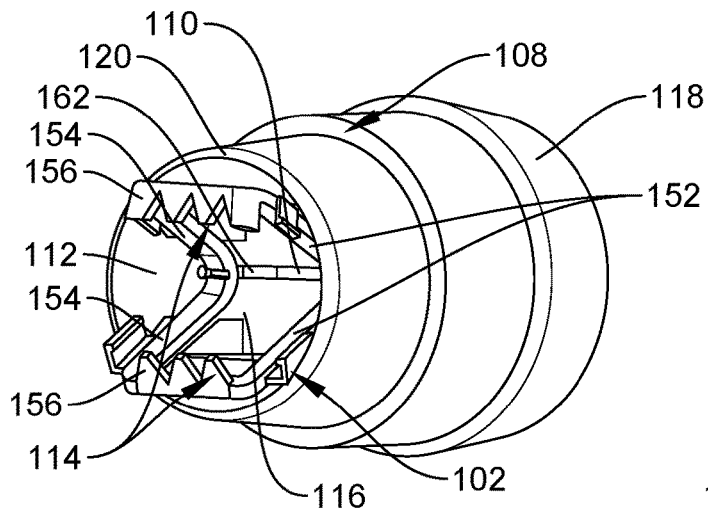
FIG. 3 shows a perspective view of the clip and a cap of the system of FIG. 1.

As shown in FIGS. 1-5, a clipping system 100 for treating tissue defects and/or perforations according to an exemplary embodiment of the present disclosure comprises a clip 102 configured to be mounted to a distal end 106 of an endoscope 104 via a cap 108. As shown in FIGS. 1-3, the clip 102 is configured to be received within a channel 112 of the cap 108 and movable relative thereto between an open configuration, in which jaws 114 thereof are separated from one another to receive tissue therebetween, as shown in FIG. 1, and a closed configuration, in which the jaws 114 are drawn toward one another via a control member 110 releasably coupled to the clip 102 to grip targeted tissue between the jaws 114.

The clip 102 is configured so that, when the jaws 114 are separated from one another in the open configuration, an opening 116 is defined via and between the jaws 114 is substantially aligned with a longitudinal axis of the cap 108 and the endoscope 104. Thus, both the clip 102 and tissue drawn between the jaws 114 of the clip 102 are within a field of view of the endoscope 104. An operator (e.g., a surgeon) may move the clip 102 between the open and closed configurations via the control member 110 until the operator is able to visually confirm that targeted tissue 10 has been gripped via the clip 102, as desired. The clip 102 further includes a lock 122 so that, upon determination that the targeted tissue 10 has been gripped by the clip 102, as desired, the clip 102 may be locked toward the closed configuration so that the clip 102 may be deployed in a body, clipped over the targeted tissue 10, as shown in FIG. 2.

Figure 4:
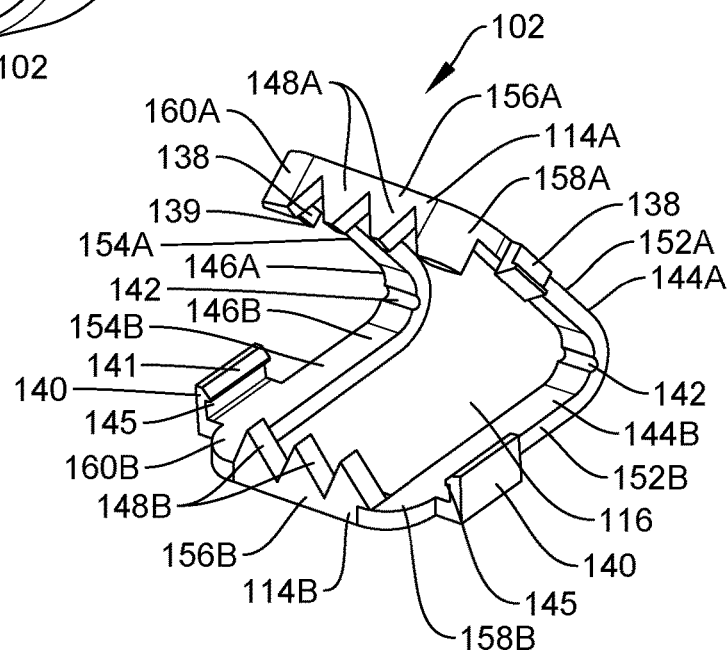
FIG. 4 shows a perspective view of the clip of the system of FIG. 1, in the open configuration.
Figure 5:
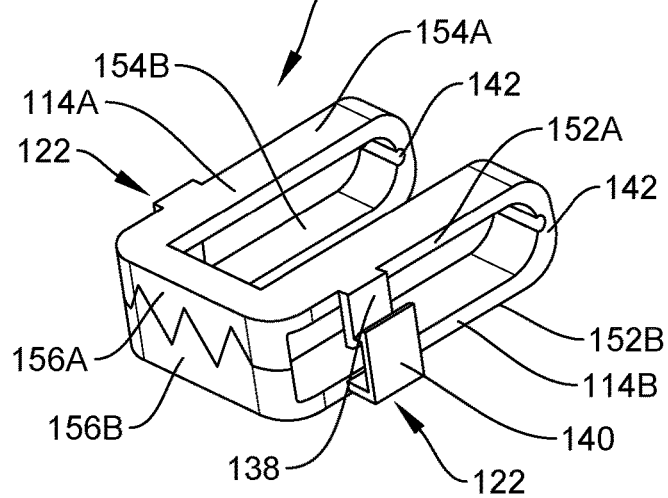
FIG. 5 shows a perspective view of the clip of the system of FIG. 1, locked in the closed configuration.

As shown in FIGS. 4-5, the clip 102 includes a pair of jaws 114—a first jaw 114A and a second jaw 114B—connected to one another via hinges 142, which permit movement of the jaws 114 relative to one another between the open configuration, in which the jaws 114 are separated from one another, and the closed configuration, in which the jaws 114 are moved toward one another. Each of the jaws 114A, 114B of this embodiment extends from a first end 144 (144A, 144B) to a second end 146 (146A, 146B) so that a first one of the hinges 142 connects the first ends 144 of the jaws 114 while a second one of the hinges 142 connects the second ends 146 of the jaws 114. According to an exemplary embodiment, each of the hinges 142 is configured as a living hinge spring biased to bias the jaws 114 toward the open configuration.

In one embodiment each of the jaws 114 extends along a U-shape from the first end 144 to the second end 146. The U-shape of each of the jaws 114 is defined via a pair of longitudinal portions 152, 154 and a lateral portion 156. In particular, the first jaw 114A is defined via a first longitudinal portion 152A extending from the first end 144A toward a distal end 158A and a second longitudinal portion 154A extending from the second end 146A toward a distal end 160A. The second jaw 114B is defined via a first longitudinal portion 152B extending from the first end 144B toward a distal end 158B and a second longitudinal portion 154B extending from the second end 146B toward a distal end 160B. The distal ends 158A, 160A of the first and second longitudinal portions 152A, 154A of the first jaw 114A are connected to one another via a lateral portion 156A while the distal ends 158B, 160B of the first and second longitudinal portions 152B, 154B of the second jaw 114B are connected to one another via a lateral portion. It will be understood by those of skill in the art that the hinges 142 and/or jaws 114 of the clips 102 may be formed of any of a variety of materials so long as the hinges 142 bias the jaws 114 toward the open configuration, as described above. In one example, portions of the clip 102 (e.g., the hinges 142) are formed of a shape memory alloy such as, for example, Nitinol. In another embodiment, portions of the clip 102 are formed of a compliant/elastic plastic having the properties described above.

The jaws 114A, 114B are connected to one another so that the first longitudinal portions 152A, 152B are connected via a first one of the hinges 142 and the second longitudinal portions 154A, 154B are connected via a second one of the hinges 142. Thus, when the jaws 114 are separated from one another in the open configuration, the lateral portions 156A, 156B of the jaws 114A, 114B are separated to define an opening 116. Thus, when the clip 102 is mounted within the cap 108, which is mounted to the distal end 106 of the endoscope 104, the opening 116 permits devices such as, for example, a tissue grasping device 150 to be passed through a working channel of the endoscope 104, through the channel 112 of the cap 108 and through the opening 116 to grasp tissue and draw the tissue proximally between the jaws 114 of the clip 102.

Alternatively, tissue may be drawn into the opening 116 between the jaws 114 via suction applied through the working channel of the endoscope 104 as would be understood by those skilled in the art. The opening 116 also permits visualization of the tissue between the jaws 114. Each of the jaws 114A, 114B of this embodiment includes gripping features such as, for example, teeth 148A, 148B or spikes so that, when the jaws 114A, 114B are moved toward one another toward the closed configuration, the gripping of the tissue by the lateral portions 156A, 156B is enhanced.

In one embodiment, the teeth 148A, 148B of each of the jaws 114A, 114B, respectively, are separated from one another along the lateral portions 156A, 156B in an alternating pattern so that, when the jaws 114A, 114B are drawn together, the teeth 148A of the first jaw 114A interlock with the teeth 148B of the second jaw 114B as shown in FIG. 5. It will be understood by those of skill in the art, however, that the teeth 148A, 148B, spikes or other gripping features of the jaws 114 may have any of a variety of shapes and/or configurations so long as they facilitate the gripping tissue between the jaws 114.

Figure 6:
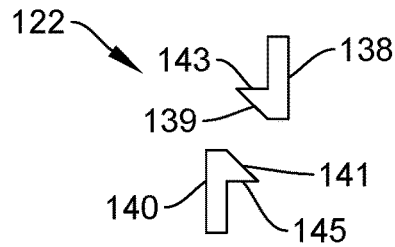
FIG. 6 shows a perspective view of a lock of the clip of the system of FIG. 1.

As described above, the clip 102 also includes the lock 122 for locking the clip 102 in the closed configuration. As shown in FIG. 6, in one embodiment, the lock 122 is comprised of a first component 138 and a second component 140 configured to engage one another when the jaws 114 are sufficiently drawn toward one another, to lock the jaws 114 relative to one another. In one embodiment, the clip 102 includes a single lock 122, the first component 138 extending along the first longitudinal portion 152A of the first jaw 114A and the second component 140 extending along a corresponding portion of the first longitudinal portion 152B of the second jaw 114B so that, when the first and second jaws 114A, 114B are drawn toward one another, angled surfaces 139, 141 of the first and second components 138, 140 engage one another and slide past each other so that engaging surfaces 143, 145, respectively snap into locking engagement with each other. In another embodiment, the clip 102 may include two locks 122—one on each side of the jaws 114. In this embodiment, first and second components 138, 140 of second lock 122 are positioned along the second longitudinal portions 154A, 154B of the first and second jaws 114A, 114B, respectively, mirroring a first lock 122 positioned in the same manner as the single lock 122 described above.

According to one embodiment, the first and second components 138, 140 of the locks 122 are configured to engage one another via a snap fit as described above. It will be understood by those of skill in the art, however, that the first and second components 138, 140 may have any of a variety of configurations so long as the first and second components 138, 140 are configured to lockingly engage one another when drawn into contact with one another.

The clip 102 is configured to be mounted on any standard endoscope 104 (or other insertion instrument) via the cap 108 which is sized, shaped and configured to be mounted over the distal end 106 of the endoscope 104 (e.g., slid over the distal end 106 and retained thereon via a friction fit). As will be understood by those of skill in the art, the endoscope 104 is configured to be inserted through a body lumen to a target area within the lumen and thus, must be sufficiently flexible to navigate through even tortuous paths of the body lumen. According to an exemplary embodiment, a proximal end of the endoscope 104 includes a handle member via which a physician or other user may guide the endoscope 104 through the body lumen (e.g., gastrointestinal tract) to a target site. Although the exemplary embodiments describe use of the clip 102 with the endoscope 104, it will be understood by those of skill in the art that the cap 108 may be sized and shaped to be mounted over the distal end of any insertion device (flexible or rigid) suitable for accessing a target site within a body at which a tissue to be clipped (e.g., targeted tissue 10) is located.

As shown in FIGS. 1-3, the cap 108 extends longitudinally from a proximal end 118 to a distal end 120 and includes the channel 112 extending longitudinally therethrough. The cap 108 is configured to be mounted over the distal end of the endoscope 104 so that the channel 112 of the cap 108 is substantially aligned with a longitudinal axis of the endoscope 104 and is in communication with a working channel of the endoscope 104. The channel extends away from the distal end 106 of the endoscope 104 so that occlusion of the field of view of the vision system of the endoscope 104 is minimized. The cap 108 is sized and shaped to correspond to a cross-sectional shape of the endoscope 104 so that the cap 108 fits thereover via a friction fit. The cap 108 is configured so that, when the cap 108 is mounted over the distal end 106 of the endoscope, a proximal portion 124 of the cap 108 extends over the distal end 106 of the endoscope 104 while a distal portion 126 of the cap 108 extends distally past the distal end 106 of the endoscope 104. The clip 102 is received within the distal portion 126 and is thus within the field of view of the endoscope.

The clip 102 is movable within the cap 108 between the open configuration and the closed configuration via the control member 110, which extends from a distal end 162 releasably coupled to the clip 102, through the endoscope 104 to a proximal end accessible to the operator of the system 100. The control member 110 may be formed as a thread wire, strand, filament or other similar flexible longitudinal element. In one embodiment, the distal end 162 is looped over one or more of the hinges 142 of the clip 102 so that, when a sufficient proximal force is applied between the clip 102 and the control member 110, the control member 110 disengages the clip 102 to release the clip 102 therefrom, deploying the clip 102.

According to an exemplary embodiment, the channel 112 along the distal portion 126 of the cap 108 includes a tapered portion 130, a planar portion 132 extending proximally of the tapered portion 130, and a shoulder 134 extending proximally of the planar portion 132. As shown in FIGS. 1-2, each of the tapered portion 130, the planar portion 132 and the shoulder 134 are defined via opposing surfaces 128 of the channel 112 which, in one embodiment, are substantially diametrically opposed relative to one another. As will be described in further detail below, the opposing surfaces 128 extending along the tapered portion 130, the planar portion 132 and the shoulder 134 are configured to interface with a corresponding one of the jaws 114 to facilitate movement of the clip 102 between the open and closed configurations, locking of the jaws 114 toward the closed configuration, and deployment of the clip 102, respectively, as the clip 102 is moved distally out of and drawn proximally into the cap 108.

Along the tapered portion 130 of the channel 112, the opposing surfaces 128 taper toward one another from the distal end 120 of the cap 108 toward a proximal end 136. When the jaws 114 of the clip 102 interface with the tapered portion 130, the clip 102 is guided between the open and closed configurations as the jaws 114 are slid longitudinally therealong. In particular, when the clip 102 is drawn proximally into the cap 108 along the tapered portion 130 by moving the control member 110 proximally relative to the endoscope 104, the jaws 114 are pushed toward one another by the tapering of the opposing surfaces 128 so that the clip 102 is moved toward the closed configuration. When the clip 102 is moved distally relative to the cap 108 along the tapered portion 130 by moving the control member 110 distally relative to the endoscope 104, the jaws 114 slide distally along the tapered portion 130 such that the clip 102 is permitted to revert toward the open configuration under its natural bias.

Although the clip 102 is moved toward the closed configuration as it is slid proximally along the tapered portion 130, while the clip 102 is sliding along the tapered portion 130, the jaws 114 are not drawn toward one another in close enough proximity so that the first and second components 138, 140 of the lock 122 engage one another. Thus, if it is determined that the clip 102 is not positioned over the targeted tissue 10, as desired, the operator may simply move the clip 102 toward the open configuration and reposition the clip 102 relative to the targeted tissue 10.

The planar portion 132 extends proximally from the proximal end 136 of the tapered portion 130. Along the planar portion 132 of the channel 112 in this embodiment, the opposing surfaces 128 are substantially planar and extend substantially parallel to one another and parallel to the longitudinal axis of the endoscope 104. The planar portion 132 is configured such that, when the clip 102 is drawn proximally along the planar portion 132, the clip 102 is locked in the closed configuration. In particular, when the clip 102 is drawn proximally along the planar portion 132, the jaws 114 are drawn close enough to one another such that the first and second components 138, 140 of the lock 122 of the clip 102 engage one another to lock the clip 102 in the closed configuration. Thus, while the clip 102 is being drawn toward the closed configuration along the tapered portions 130, if it is determined that the clip 102 is gripping the targeted tissue 10, as desired, the operator may continue to draw the control member 110 proximally until the clip 102 is received within the planar portion 132 of the channel 112 to lock the clip 102 closed. As the clip 102 is slid proximally along the planar portions 132, distal ends of the jaws 114 are drawn into closer proximity relative to one another until the first and second components 138, 140 of the lock engage one another.

Proximally of the planar portion 132, the opposing surfaces 128 extend radially inward to define the shoulder 134. A portion of the channel 112 defined via the shoulder 134 is smaller than a portion of the channel 112 defined via the planar portion 132 so that the shoulder 134 may act as a proximal stop for the clip 102. In particular, as described above, when the operator of the system 100 determines that the target tissue is gripped via the clip 102, as desired, the clip 102 is moved proximally along the planar portion 132 to lock the clip 102 toward the closed configuration.

When the clip 102 is locked in the closed configuration, the operator may continue to draw the clip 102 proximally through the channel 112 via the control member 110 until a portion of the clip 102 engages the shoulder 134, which prevents the clip 102 from being moved any further proximally relative to the cap 108. When continued proximal force is applied to the control member 110 after this point, and tension on the control member 110 builds until it exceeds a predetermined threshold value, the control member 110 is separated from the clip 102, releasing the clip 102 from a remaining portion of the system 100 to deploy the clip 102 in the body. At this point, the endoscope 104 and the cap 108 may be withdrawn from the body leaving the clip 102 clipped in place over the targeted tissue.

According to an exemplary method for tissue closure utilizing the clipping system 100, the clip 102 may be inserted through a body lumen such as, for example, the gastrointestinal tract, to a target area within the body lumen via the endoscope 104. The clip 102 is mounted within the distal portion 126 of the cap 108 so that the clip 102 is guided to the target area via the endoscope 104 and positioned over targeted tissue 10. As described above, the clip 102 is movable relative to the cap 108 between the open and closed configurations through operation of the control member 110.

While the clip 102 is in the open configuration, the tissue grasping device 150 may be passed through the working channel of the endoscope and through the opening 116 of the clip 102 to grasp the targeted tissue 10 and draw the tissue proximally into the channel 112 of the cap 108 and between the jaws 114 of the clip 102. Once the targeted tissue 10 has been drawn between the jaws 114, the clip 102 may be moved toward the closed configuration by drawing the control member 110 proximally relative to the endoscope 104 so that the jaws 114 slide proximally along the tapered portion 130 of the channel 112.

The clip 102 may be moved between the open and closed configurations, as necessary, until the operator visually determines that the targeted tissue 10 has been gripped between the jaws 114 of the clip 102, as desired. Once the operator visually confirms that the targeted tissue 10 has been gripped by the clip 102, as desired, the control member 110 is drawn proximally relative to the endoscope 104 to draw the clip 102 proximally into the planar portion 132 of the channel 112. As described above, as the clip 102 is slid proximally along the planar portion 132, the first and second components 138, 140 engage one another to lock the clip 102 in the closed configuration.

Upon locking of the clip 102, the operator continues to draw the control member 110 proximally relative to the endoscope 104 until a portion of the clip engages the shoulder 134, preventing the clip 102 from moving further proximally relative thereto. The operator then continues to apply proximal force on the control member 110 until this force exceeds the predetermined threshold value at which the control member 110 is separated from the clip 102. The clip 102 is thereby released from the control member 110, so that the clip 102 is deployed in the body, clipped over the target tissue.

It will be apparent to those skilled in the art that various modifications may be made in the present disclosure, without departing from the scope of the disclosure. Furthermore, those skilled in the art will understand that the features of any of the various embodiments may be combined in any manner that is not inconsistent with the description and/or the functionality of the embodiments.

What is claimed is:

1. A clipping system for treating tissue, comprising:
   a cap configured to be mounted over a distal end of an endoscope, the cap extending longitudinally from a proximal end to a distal end and including a channel extending therethrough, a proximal portion of the cap configured to be mounted over the endoscope such that a distal portion of the cap extends distally past the distal end of the endoscope, a distal portion of the channel including opposing surfaces therealong defining a tapered portion tapering from the distal end of the cap toward a proximal end of the tapered portion;
   a clip configured to be mounted within the cap, the clip including first and second jaws movably connected to one another via hinges, at least one of the hinges being biased to move the first and second jaws away from one another, the clip movable relative to the cap between an open configuration, in which the first and second jaw are separated from one another to receive tissue therebetween, and a closed configuration, in which the first and second jaws are moved toward one another to grip tissue therebetween, when the first and second jaws are slid longitudinally along the tapered portion of the channel, wherein the clip includes a lock configured to lock the clip toward the closed configuration, the lock including a first component extending from the first jaw and a second component extending from the second jaw, the first and second components configured to engage one another when the first and second jaws are drawn sufficiently close to one another; and
   a control member extending from a distal end releasably coupled to the clip to a proximal end accessible via a user, the control member longitudinally movable relative to the cap to move the clip between the open and closed configurations.

2. The system of claim 1, wherein the first and second components are configured to engage one another via a snap fit.

3. The system of claim 1, wherein the opposing surfaces along the distal portion of the channel of the cap define a planar portion extending proximally from the proximal end of the tapered portion, the planar portion extending parallel to a longitudinal axis of the system so that, when the clip is drawn proximally thereinto, the first and second jaws are drawn toward one another so that the first and second components of the lock engage one another.

4. The system of claim 3, wherein the opposing surfaces along the distal portion of the channel also define a shoulder extending proximally of the planar portion, the shoulder extending radially inward relative to the planar portion such that, when a portion of the clip engages the shoulder, the clip is prevented from moving any further proximally therepast.

5. The system of claim 1, wherein each of the first and second jaws are substantially U-shaped extending from a first end to a second end, first ends of the first and second jaws connected to one another via a first one of the hinges and second ends of the first and second jaws connected to one another via a second one of the hinges.

6. The system of claim 1, wherein the first and second jaws are configured such that, when the clip is in the open configuration, the first and second jaws define an opening therebetween.

7. The system of claim 1, wherein a distal portion of the control member is releasably looped over at least one of the hinges of the clip, the distal portion of the control member configured to release the clip when a force exerted thereon exceeds a predetermined threshold value.

8. The system of claim 1, wherein each of the first and second jaws include tissue gripping features extending therefrom, toward one another.

9. A tissue clipping system, comprising:
an endoscope extending longitudinally from a proximal end to a distal end and including a working channel extending therethrough;
a cap extending longitudinally from a proximal end to a distal end and including a channel extending therethrough, the cap configured to be mounted over the distal end of the endoscope so a proximal portion of the cap extends over the endoscope, a distal portion of the cap extends distally past the distal end of the endoscope, and the channel of the cap is aligned with the working channel of the endoscope, an interior of a distal portion of the channel including opposing surfaces therealong defining a tapered portion tapering from the distal end of the cap toward a proximal end of the tapered portion and a planar portion extending proximally from the proximal end of the tapered portion;
a clip including first and second jaws movably connected to one another via hinges, at least one of the hinges being biased to move the first and second jaws away from one another, the clip movably mounted within the cap so that the clip is movable relative to the cap between an open configuration, in which the first and second jaw are separated from one another to receive tissue therebetween, and a closed configuration, in which the first and second jaws are moved toward one another to grip tissue therebetween, when the first and second jaws are slid longitudinally along the tapered portion of the channel, the clip including a lock configured to lock the first and second jaws relative to one another toward the closed configuration when the clip is moved proximally along the planar portion of the channel; and
a control member extending from a distal end releasably coupled to the clip, through the working channel of the endoscope to a proximal end accessible via a user, the control member longitudinally movable relative to the endoscope to move the clip between the open and closed configurations.

10. The system of claim 9, wherein the lock includes a first component extending from the first jaw and a second component extending from the second jaw, the first and second components configured to engage one another when the first and second jaws are slid proximally along the planar portion.

11. The system of claim 9, wherein the opposing surfaces along the distal portion of the channel also define a shoulder extending proximally of the planar portion, the shoulder extending radially inward relative to the planar portion such that, when a portion of the clip engages the shoulder, the clip is prevented from moving any further proximally therepast.

12. The system of claim 11, wherein the control member is releasably coupled to the clip such that, when the clip proximally engages the shoulder and a force exerted on the control member exceeds a predetermined threshold value, the clip is released from the control member.

13. The system of claim 9, wherein the first and second jaws are configured such that, when the clip is in the open configuration, the first and second jaws define an opening therebetween.

14. The system of claim 9, further comprising a tissue grasping device configured to be inserted through the working channel of the endoscope and between the first and second jaws of the clip to grasp a target tissue and draw the target tissue into the cap between the first and second jaws.

15. A method for treating tissue, comprising:
inserting a clip to a target area in a body lumen via an endoscope, in an insertion configuration, the clip mounted to a distal end of the endoscope via a cap, a proximal end of the cap extending over the distal end of the endoscope and a distal portion of the cap extending distally of the distal end of the endoscope, the clip mounted within the distal portion of the cap so that the clip is within a field of view of the endoscope;
moving the clip toward an open configuration, in which first and second jaws of the clip are separated from one another, by drawing a control member releasably coupled to the clip distally relative to the endoscope so that the first and second jaws slide distally along a tapered portion of a channel of the cap, which flares outward from a proximal end of the tapered portion toward a distal end of the cap;
drawing target tissue into the cap and between the first and second jaws;
moving the clip toward a closed configuration, in which the first and second jaws of the clip are moved toward one another to grip the target tissue therebetween, by drawing the control member proximally relative to the endoscope so that the first and second jaws slide proximally along the tapered portion; and
locking the clip toward the closed configuration by drawing the control member further proximally until the first and second jaws of the clip slide proximally along a planar portion of the channel extending proximally from the proximal end of the tapered portion, a distance between opposing surfaces of the planar portion being selected so that when the clip is slid proximally along the planar portion, the first and second jaws are moved toward one another via a distance causing a lock thereof to engage.

16. The method of claim 15, further comprising:
moving the clip toward the open configuration to reposition the clip relative to the target tissue prior to locking of the clip; and
moving the clip toward the closed configuration so that repositioned first and second jaws of the clip grip the target tissue.

17. The method of claim 15, further comprising:
deploying the clip by drawing the control member proximally relative to the endoscope so that the clip engages a shoulder proximal of the planar portion, which prevents the clip from moving further proximally relative thereto, and a force exerted on the control member exceeds a predetermined threshold value so that the clip is separated from the control member.

18. The method of claim 15, wherein the drawing of the target tissue into the cap and between the first and second jaws includes inserting a tissue grasper through a working channel of the endoscope and between the first and second jaws to grasp the target tissue.

19. The method of claim 15, wherein the lock of the clip includes a first component extending from the first jaw and a second component extending from the second jaw, the first and second jaws configured to engage one another via a snap fit.

\* \* \* \* \*